Jan. 8, 1929.  1,698,083

W. N. BOOTH

METHOD OF FORMING VEHICLE WHEEL RIMS

Filed May 11, 1925    2 Sheets-Sheet 1

Inventor
William N. Booth

By Whittemore Hulbert Whittemore Belknap,
Attorneys

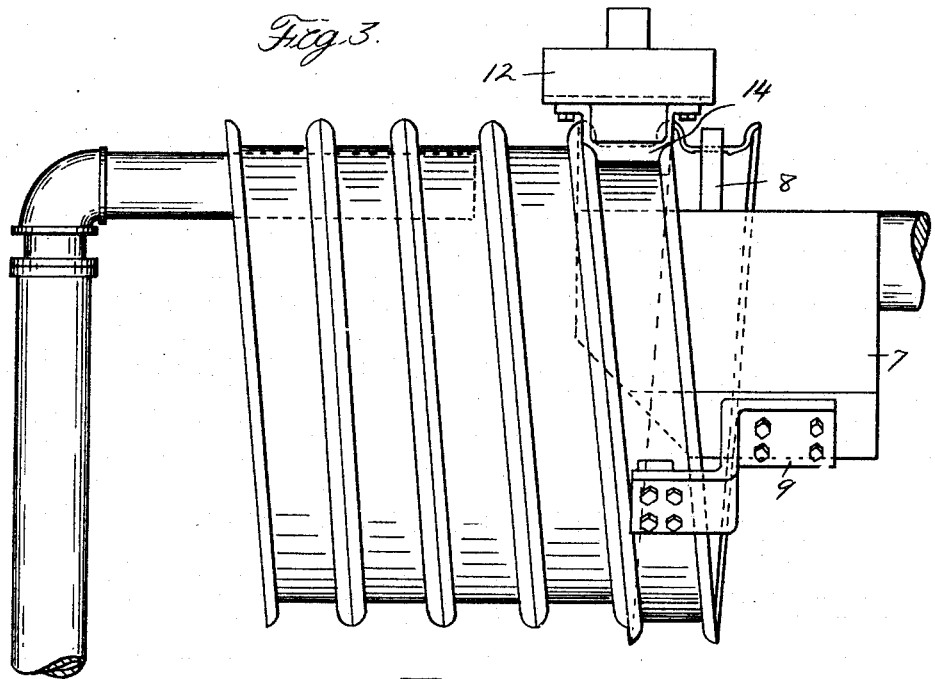
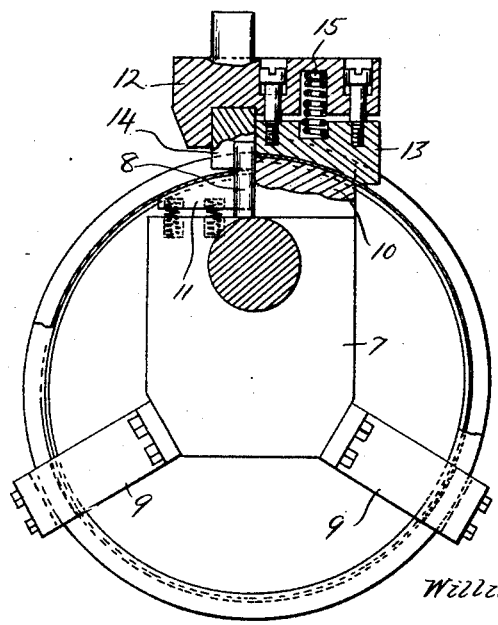

Patented Jan. 8, 1929.

1,698,083

UNITED STATES PATENT OFFICE.

WILLIAM N. BOOTH, OF DETROIT, MICHIGAN, ASSIGNOR TO KELSEY-HAYES WHEEL CORPORATION, OF DETROIT, MICHIGAN, A CORPORATION OF NEW YORK.

METHOD OF FORMING VEHICLE-WHEEL RIMS.

Application filed May 11, 1925. Serial No. 29,608.

The invention relates to the manufacture of vehicle wheel rims and refers more particularly to the manufacture of tire carrying rims of the demountable type. Heretofore it has been the usual practice in the manufacture of a tire carrying rim to pass a bar of stock through a forming roll machine to produce an annulus. The flats at the ends of this bar of stock and particularly the front end have then been removed either by severing the same from the formed stock or by a number of expensive forming operations. In either case the cost of manufacture per rim has been excessive owing in the first instance to the excessive waste of material per rim and in the second instance to the excessive cost of the necessary forming operations.

With my invention the cost of manufacture per rim is greatly reduced. With this as well as other objects in view the invention resides in the novel features as more fully hereinafter set forth.

In the drawings:—

Figure 3 is a side elevation of a severing machine and showing the method of carrying out the second operation in the manufacture;

Figure 4 is a sectional end view thereof.

Figure 1:
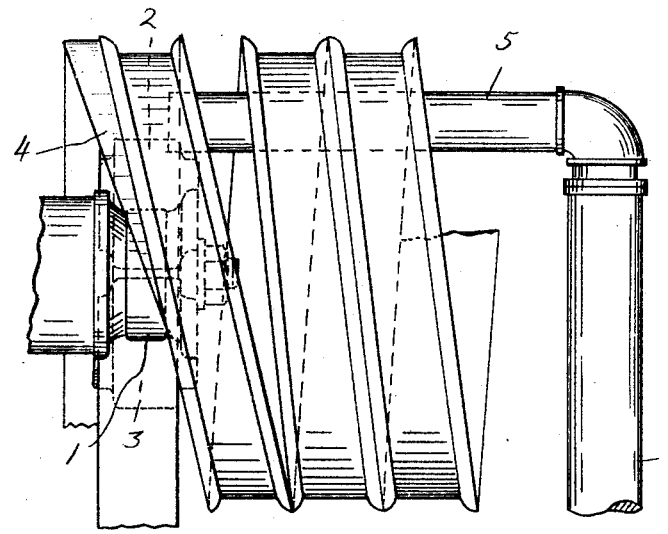
Figure 1 is a side elevation of a portion of a forming roll machine and showing the method of carrying out the first operation in the manufacture embodying my invention.
Figure 2:
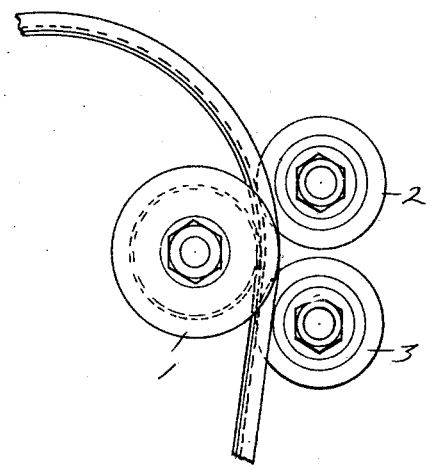
Figure 2 is an end view thereof.

In the present instance a bar of stock having a cross section corresponding to that of the tire carrying rims to be formed and having a length sufficient to produce a plurality of tire carrying rims is inserted between the forming rolls 1 and 2 and 3 of a usual forming roll machine such as a pyramid roll machine. These rolls are arranged to bend the stock with a constant radius of curvature as long as the stock is completely between the rolls. The stock after passing between the rolls is deflected out of the path of the unformed stock by the stationary deflector 4 upon the forming roll machine, which compels the stock to assume a spiral form, or as specifically shown, a helical form. The extent to which the stock is deflected is preferably within the limits of elasticity of the stock. This helically formed stock may be suitably supported while the bar is being passed between the forming rolls as by means of the horizontal rod 5 supported upon the upright 6.

In the present instance, after the complete bar of stock has been helically formed with a number of convolutions lying laterally adjacent to each other, it may then be operated upon by severing the same to form the separate rims. As shown in Figures 3 and 4 this helically formed stock is rotated over an anvil 7 until one of its ends, preferably its last formed end, comes into contact with the stop 8 formed by suitable means such as a pin projecting radially from the anvil. The anvil preferably has the supporting brackets 9 and the die 10 which are angularly spaced thereabout, the brackets being engageable with the outer face of the stock and the die with the inner face of the stock to support the same to assist in accurately determining the circumference. The anvil is also preferably provided with the pad 11 laterally adjacent to the die 10 and adapted to resiliently hold the portion of the stock thereover in lateral alignment with the portion of the stock over the die 10. 12 is a block carried by the ram of the press and supporting the hold down pad 13 and the cutter 14. The hold down pad is resiliently forced downward by means of the coil spring 15 and normally occupies a position such that it will come into contact with the stock above the die 10 prior to engagement of the cutter 14 with the stock above the pad 11 to thereby clamp the stock prior to its severing. The press ram is then operated to sever the stock and form the first rim, after which the formed stock is again rotated against the stop and the press ram is again operated, these steps continuing until the stock has been completely made up into a number of rims. After the stock has been severed into rims, the ends of these rims will spring back into registration with each other owing to the fact that the deflection of the stock in the forming roll machine is within its limits of elasticity.

From the above description it will be readily seen that the cost of manufacture of the tire carrying rims is materially reduced owing to the fact that a plurality of rims is formed from the same stock thereby decreasing the waste of material per rim or the number of forming operations per rim.

While it is believed that from the foregoing description the nature and advantages of the invention will be readily apparent, I desire to have it understood that I do not limit myself to what is herein shown and described and that such changes may be resorted to when desired as fall within the scope of what is claimed.

What I claim as my invention is:

1. The method of forming a vehicle wheel rim member which consists in progressively forming with a continuous arc stock having a cross section substantially of the completed rim member and of a length to produce a plurality of rim members, deflecting the formed stock out of the path of the stock to be formed and into a spiral, and severing the formed stock to produce a substantially completed rim member.

2. The method of forming a vehicle wheel rim member which consists in progressively forming with a constant curvature stock having a cross section substantially of the completed rim member and of a length to produce a plurality of rim members deflecting the formed stock within its limits of elasticity out of the path of the stock to be formed and into a helix and severing the formed stock to produce a substantially completed rim with its ends substantially registering.

3. The method of forming a vehicle wheel rim member which consists in forming a bar of stock having a cross section substantially of the completed rim member and of a length to produce a plurality of rim members, form-rolling the bar of stock with a continuous arc and severing the form-rolled stock at predetermined points in its length to produce a substantially completed rim.

4. The method of forming a vehicle wheel rim member which consists in progressively forming with a constant radius of curvature stock having a cross section substantially of the completed rim member and of a length to produce a plurality of rim members, deflecting the formed stock within its limits of elasticity out of the path of the stock to be formed and into a helix severing the flat end of the formed stock and subsequently severing the formed stock at predetermined lengths.

5. The method of forming a vehicle wheel rim member which consists in passing a bar of stock having a cross section substantially of the completed rim member and of a length to produce a plurality of rim members through a pyramid roll machine thereby hooping the stock, helically forming the hooped stock and subsequently severing the helically formed stock at predetermined points to produce a plurality of substantially completed rim members.

6. The method of forming vehicle wheel rim members which consists in continuously forming from stock of a length to produce a plurality of rim members hooped stock having a cross section substantially of the completed rim member, deflecting the hooped stock out of the path of the stock to be hooped and severing the hooped stock to produce a plurality of substantially completed rim members.

7. The method of forming vehicle wheel rim members which consists in continuously forming from stock of a length to produce a plurality of rim members hooped stock having a cross section substantially of the completed rim member, deflecting the hooped stock within its limit of elasticity out of the path of the stock to be hooped and into a helix and severing the hooped stock to produce a plurality of substantially completed rim members.

In testimony whereof I affix my signature.

WILLIAM N. BOOTH.